UNITED STATES PATENT OFFICE.

EUGÈNE CAREZ, OF BRUSSELS, BELGIUM.

PROCESS OF FERMENTING.

SPECIFICATION forming part of Letters Patent No. 432,861, dated July 22, 1890.

Application filed September 24, 1889. Serial No. 324,944. (No specimens.) Patented in Belgium November 28, 1888, No. 84,509; in Germany December 17, 1888, No. 49,141; in Austria-Hungary December 18, 1888, No.18,113 and No. 29,999; in France December 20, 1888, No. 194,904, and in England April 1, 1889, No. 5,564.

*To all whom it may concern:*

Be it known that I, EUGÈNE CAREZ, a subject of the King of Belgium, have invented certain new and useful Improvements in the Process of Fermenting, of which the following is a specification, and for which foreign patents have been obtained in Belgium November 28, 1888, No. 84,509; Germany December 17, 1888, No. 49,141; France December 20, 1888, No. 194,904; Austria-Hungary December 18, 1888, No. 18,113 and No. 29,999, and Great Britain April 1, 1889, No. 5,564.

My process being based on new data, I am obliged to make some preliminary remarks in order to make clear the description that follows.

It has been proved that the amount of diastase which germinating grains contain does not generally correspond in practice with the theoretical amount which should be produced. Theoretically a minimum quantity of malt should by its yield of active matters convert into saccharine a considerable quantity of amylaceous matter. I find, on the contrary, in practice that a relatively considerable quantity of malt must be used to arrive at even an imperfect degree of saccharification. The cause of this phenomenon is found to be in an impairing of the diastase through the development of ferments which are harmful to it. Thus it is that malt worts left at the usual temperature for saccharification, being impaired by the chemical action referred to, become gradually weaker, and at the end of a longer or shorter, but always relatively short, time, lose all their activity. The same phenomenon appears during the period of saccharification of amylaceous matters by malt. The germs of the ferments, so abundant in germinating grains, are developed little by little in worts and gradually arrest the action of the diastase. To remedy this difficulty it has been proposed to add to worts undergoing saccharification various acids, such as nitric, hydrochloric, or sulphuric. These acids preserve the worts more or less from alteration. Unfortunately the quantities of these acids necessary to give this result weaken the diastase to a very considerable degree, and the final result is that nothing or very little, as regards saccharification, is gained by their use.

The present modes of preserving the worts undergoing saccharification generally consist of assisting them by means of the temperature and by chemical agents not favorable to the development of harmful ferments; but still the desired result has not been attained, for on the one hand the worts are mixed with simple infusions of malt, which always contain ferments, and on the other hand the chemicals, being placed in a diluted material, cannot act efficaciously and thus preserve the diastase intact. Taking these facts into consideration I have endeavored to purify malt by an antiseptic which, in weak doses, should have no action on the diastase, while at the same time it should destroy the germs of other ferments. In my researches I have discovered that hydrofluoric acid will attain this result. In fact, by adding to a liter of infusion of malt corresponding to about two hundred to three hundred grams of malt two or three drops of commercial hydrofluoric acid, I can preserve it for eight or ten days without the liquid undergoing the least alteration or losing any of its saccharifying principle. I have, besides, discovered that an infusion of malt, acidulated by hydrofluoric acid in the above-named proportions, has its maximum saccharifying power at 25° to 30° centigrade and not at the temperature of 50° to 60° centigrade, usually employed for this purpose. The preliminary purification of the malt by hydrofluoric acid allowed me to obtain a very economical working, by which means I realized a very considerable saccharification from a small quantity of malt. Further, my first successes led me to apply the same principle to the fermentation, and my experiments have shown me that hydrofluoric acid has a very favorable action on the yeast; that it prevents the development of other ferments, and that its employment increases by this means very considerably the yield of alcohol.

1. *Preparation of infusion of malt and diastase in the form of a concentrated extract.*—I add to the crushed malt, diluted with two or three times its volume of cold water, ten to twenty grams of commercial hydrofluoric acid (containing about twenty per cent. of pure hydrofluoric acid) for every hundred liters of the liquid, taking care to keep the malt in suspension for some time. The temperature of the mixture of malt, water, and acid is the same as the surrounding temperature of the works—e. g., from 15° to 30°, which is the ordinary temperature of the works. I mean by this that it is not necessary to heat or cool the mixture. This operation deprives the malt of every germ of foreign ferments and at the same time produces a liquid quite suitable for employment as a liquefying and saccharifying agent. According to the amount of work which this liquor must perform I neutralize, at the end of some hours, the hydrofluoric acid by means of carbonate of lime, or I leave it as free acid, when the liquor must produce saccharification in materials already containing lime salts. Instead of employing, as already shown, the diastasic liquor, I can also first separate the dregs so as only to preserve the amylin and the extract. This amylin and extract can be used as they are, or I can still further separate them by filtration or by decanting, or by turbinage, and I then obtain a clear, or almost clear, liquid, which forms an unchangeable infusion. By evaporating this liquid in a vacuum at a maximum temperature of 65° to 70° centigrade I produce solid diastase in the form of a yellowish powder, an equal weight of which possesses a saccharifying action twenty-five to thirty times stronger than that of malt. The temperature of 65° centigrade must not be exceeded when we wish to obtain a product of a highly-saccharifying power.

II. *Manufacture of liquid sirups and of sugar.*—As raw material I employ maize by preference, although my mode of working is adapted equally to starch and all other amylaceous materials. To maize steeped or unsteeped, ground or unground, is added three or four times its volume of water, and it is then boiled under a pressure or three or four atmospheres for one or two hours by means of the usual apparatus. The boiling being finished, the liquid is cooled to 30° or 40° centigrade, either by addition of cold water or by means of a refrigerator at the surface, or by any other mode. When brought to this temperature, I add thereto the diluted malt or the infusion with amylin or the clear extract of malt, or even the solid diastase prepared as detailed in the preceding paragraph I. I employ from five to thirty per cent. of malt, according to the degree of saccharification which it is desired to obtain. The temperature of the liquid after the addition thereto of the infusion should fall from 15° to 25° centigrade, and it is then left for saccharification, of which the duration may vary from several hours to forty-eight hours, according to the nature of the product I wish to obtain and the quantity of dextrine I wish to retain therein. If the materials contain dregs in suspension, as is the case with maize and cereals generally, I can, after two or more hours, separate these dregs either by means of a filter-press, or by turbinage, or by sifting, or by any other method generally employed. The filtered liquor is then passed into the settling-vats, where the saccharification goes on vigorously at a temperature of about 20° centigrade. According to whether I wish to obtain a sirupy or solidified product, I arrest the saccharification more or less quickly. I boil the liquor then with a little carbonate of lime. Afterward the liquor is evaporated at 38° to 42° Baumé after a preliminary filtration on any kind of filter.

III. *Alcoholic fermentation.*—My system of making alcohol is based on the same method as that for the manufacture of sirups, as shown above. Maize or other similar articles, with or without previous bruising, must be thoroughly crushed under pressure and worked in the same manner as when the infusion of malt is added. Diastase, with the addition of hydrofluoric acid, as described above, is then added in one of the forms and at the temperature named for the manufacture of sirups, either in the form of concentrated diastase or in the form of a clear infusion with or without amylin, or finally in the form of ground malt. As soon as the saccharification is thoroughly commenced, I add to the liquid, filtered or not, yeast which has remained for several hours in contact with hydrofluoric acid used at the rate of fifteen to twenty grams of acid of commerce (at about twenty per cent. of pure acid) per hectoliter of liquid yeast. The employment of a diastase agent and of a yeast very active and deprived of the elements in them detrimental to alcoholic fermentation allows me to obtain regularly a return of thirty-eight liters of alcohol per one hundred kilos of maize containing sixty-three per cent. of amylin.

I have further discovered in the course of my investigations that commercial hydrofluoric acid in the proportion of five to fifteen grams per hectoliter of wort can be employed as a simple preservative, and that without modifying in the slightest any one of the ordinary processes in use in manufactories. The addition of hydrofluoric acid in the above-named proportion can be made before, during, or after saccharification, before or after the addition of the yeast, and during the fermentation, and even before the boiling under pressure, in a given quantity, which may be even considerably increased if care be taken to correct the too great acidity after boiling. I have also found that the preservative action of hydrofluoric acid acts not only on the diastase, but also on the yeast, preserving the latter, and that if care be taken during the saccharification of amylaceous substances by acids, with the view of obtaining alcohol to add to the worts, either before or after the saccharification, before or after the addition of the yeast, or even during the course of the fermentation, any quantity of hydrofluoric acid up to the point where fermentation is possible a much greater return than usual may be obtained. On this subject it may be observed that if in the boiling of feculent and amylaceous substances, either with a view to the production of starch-sugar or to alcoholic fermentation, sulphuric, oxalic, hydrochloric, or other acids generally used, be replaced by commercial hydrofluoric acid it suffices to employ one per cent. at most of this latter to yield at the end of one or two hours' pressure of three atmospheres wort saccharified to at least nine-tenths. The point is very important, as it means the use of a relatively very small quantity of acid, and because the fluoride of calcium formed during neutralization is much less soluble than sulphate of lime, and consequently is eliminated more easily.

Especially in the case of the treatment of feculent and amylaceous substances with a view to alcoholic fermentation it will be sufficient after boiling to neutralize with carbonate of lime up to a point at which it can be determined by an experiment (test) that the acidity remaining is not in excess for the purpose of fermentation. The same results are obtained in the case of the fermentation of worts from beet-root and molasses. In the case of molasses in particular I have discovered that if instead of adding, as usual, about one per cent. of commercial hydrofluoric acid per one hundred kilos of molasses a sufficient quantity of sulphuric acid be added to render them slightly acid, and that if care be taken, besides, to add any required quantity of commercial hydrofluoric acid (and generally a quantity of five to fifteen grams of commercial hydrofluoric acid per hectoliter of wort suffices) not only will a larger yield of alcohol be obtained, but also a much greater one of carbonate of potash than is the case at present in the production of alcohol by means of sulphuric acid. Finally, I have found that in the treatment of any raw material for producing alcoholic fermentation and yielding a residue utilizable in any manner, either for the feeding of cattle or for any other purpose, if care be taken either before or after distillation to add to the fermented worts or to the residue a quantity of about five to fifteen grams of hydrofluoric acid or more per hectoliter of wort or mash the duration of their keeping is greatly enhanced. This is of great importance for manufacturers of alcohol, especially for those who have need to keep the residues for several days or for those who intend to utilize them. If further care be taken when the residue is required for use to add a small quantity of lime, potash, soda, or even of any other alkalies or salts capable of neutralizing the hydrofluoric acid, the article is then rendered immediately available without any change and similar to that produced only a few hours before.

By the addition of a stronger dose of acid it is possible to preserve the residue for an almost indefinite time.

I am aware that it has been proposed to use chemical compounds containing fluorine for antiseptic purposes in general. My invention relates specifically to the manufacture of diastase, sirups, and alcohol from amylaceous substances, in which process I have found very beneficial results from the introduction of hydrofluoric acid in the mash or infusion, as explained.

I declare that what I claim is—

1. The process of preventing the development of injurious and destructive ferments in the manufacture of sirups, sugar, or alcohol, which consists in subjecting a wort of amylaceous substances to the action of hydrofluoric acid in about the proportions and manner described.

2. The process of preventing the development of injurious and destructive ferments in the manufacture of sirups, sugar, and alcohol, which consists in subjecting a wort of amylaceous substances to the action of diastase mixed previously with hydrofluoric acid in about the proportions and manner described.

3. The process of preventing the development of injurious and destructive ferments in the manufacture of sirups, sugar, or alcohol, which consists in subjecting a wort of amylaceous substances to the action of diastase and hydrofluoric acid, and subsequently adding yeast treated with hydrofluoric acid, substantially as herein set forth.

4. In manufacturing diastase, the process of preventing the development of injurious ferment, which consists in making an infusion of malt, adding thereto hydrofluoric acid in about the proportions stated, and finally separating the dregs from the solution of diastase.

5. The process of saccharifying amylaceous substances at a low temperature from 20° to 30° centigrade by means of an infusion of malt treated with hydrofluoric acid, substantially as and for the purposes set forth.

EUGÈNE CAREZ.

Witnesses:
AUG. TOERISSEN,
CL. MAILLIEN.